United States Patent [19]

Matsuda et al.

[11] Patent Number: 4,884,606
[45] Date of Patent: Dec. 5, 1989

[54] PNEUMATIC TIRES HAVING IMPROVED WET PERFORMANCES

[75] Inventors: Hideki Matsuda, Tokyo; Hidenori Takahashi, Sayama, both of Japan

[73] Assignee: Bridgestone Corporation, Tokyo, Japan

[21] Appl. No.: 4,309

[22] Filed: Jan. 7, 1987

Related U.S. Application Data

[63] Continuation of Ser. No. 728,536, Apr. 29, 1985, abandoned.

[30] Foreign Application Priority Data

May 2, 1984 [JP] Japan .................................. 59-87799

[51] Int. Cl.$^4$ .............................................. B60C 11/12
[52] U.S. Cl. .......................... 152/209 R; 152/DIG. 3
[58] Field of Search ......... 152/209 R, 209 D, DIG. 3

[56] References Cited

U.S. PATENT DOCUMENTS

| | | | |
|---|---|---|---|
| 2,094,636 | 10/1937 | Bull ................................... | 152/209 R |
| 2,538,491 | 1/1951 | Winston ............................ | 152/209 R |
| 2,926,715 | 3/1960 | Corstantakes ..................... | 152/209 R |
| 3,688,462 | 10/1972 | Jacobs ............................... | 152/209 R |
| 3,749,145 | 7/1973 | Hart et al. ........................ | 152/209 R |
| 3,954,130 | 5/1976 | Verdier ............................. | 152/209 |
| 4,078,596 | 3/1975 | Nayayama et al. ............... | 152/209 R |

FOREIGN PATENT DOCUMENTS

| | | |
|---|---|---|
| 420021 | 12/1971 | Australia . |
| 450920 | 7/1974 | Australia . |
| 468129 | 12/1975 | Australia . |
| 488901 | 11/1977 | Australia . |
| 489340 | 12/1977 | Australia . |
| 522188 | 6/1940 | United Kingdom ............ 152/209 R |
| 2056925 | 3/1981 | United Kingdom . |

Primary Examiner—Michael W. Ball
Assistant Examiner—Geoffrey L. Knable
Attorney, Agent, or Firm—Sughrue, Mion, Zinn, Macpeak & Seas

[57] ABSTRACT

A pneumatic tire having improved wet performances is disclosed, which comprises a tread of a rib type pattern divided into three or more ribs by at least two circumferential grooves so that the tread defines both side regions and the remaining central region by a pair of the circumferential grooves arranged close to both side ends of the tread and is provided at each region with sipes. In this type of the tire, each of the sipes arranged on both side regions is inclined at a small angle with respect to the transverse line of the tire and each of the sipes arranged on the remaining central region is inclined at a small angle with respect to the circumferential line of the tire.

4 Claims, 2 Drawing Sheets

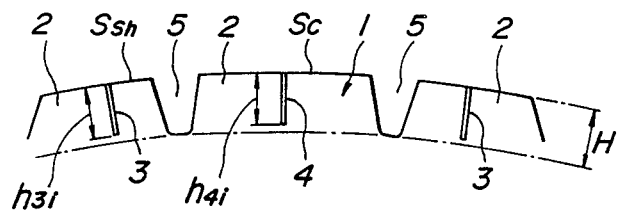
FIG_1a
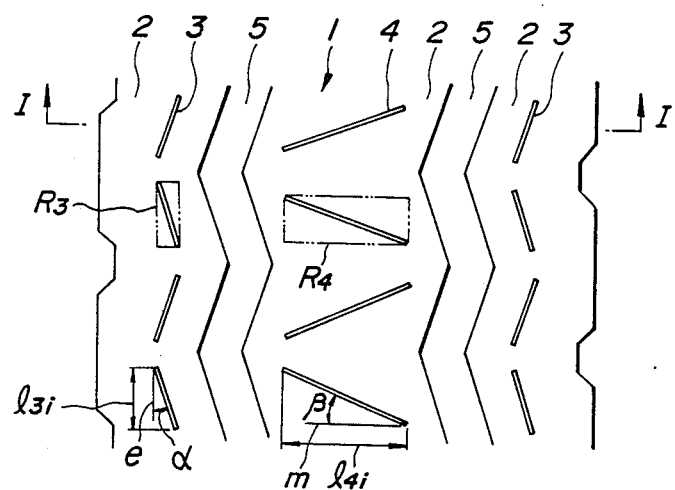
FIG_1b

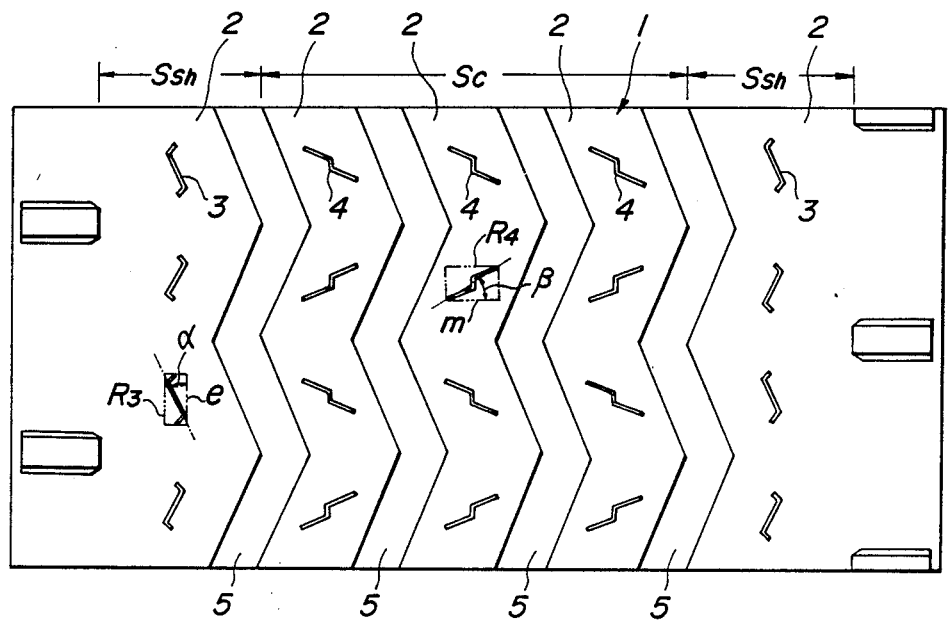
FIG_2

PNEUMATIC TIRES HAVING IMPROVED WET PERFORMANCES

This is a continuation of Ser. No. 728,536, filed on Apr. 29, 1985, now abandoned.

BACKGROUND OF THE INVENTION

1. Field of the Invention

This invention relates to an improvement of pneumatic tires usually used for the smooth running of automotive vehicles inclusive of truck and bus particularly driven under high loading. More particularly, it relates to a tread pattern in the pneumatic tire having improved wet performance for ensuring safe movement under rainy state.

2. Description of the Prior Art

Generally speaking, there have hitherto been known the following countermeasures for the improvement of wet performance, but they have still problems as mentioned below.

1. A rubber having a rich content of SBR is used as a tread rubber. This brings about the degradation of heat build-up performance and has a restriction in the application to high-speed running or heavy load tires.

2. The drainage ability is enhanced by the enlargement of groove width or the increase of the number of grooves. This is accompanied with the reduction of rigidity in ribs and cannot avoid the degradation of wear performance.

3. Sipes are arranged in the rib. This produces a cutting action to water stream based on an edge effect in the ground contact area of the tread, but is difficult to simultaneously establish the cornering property and braking or traction property.

SUMMARY OF THE INVENTION

As a result of many experiments and examinations on sipe and its arrangement, it is an object of the invention to provide pneumatic tires having improved wet performances between the cornering property and the braking or traction property without the degradation of wear properties by specifying an appropriately and functionally alloting arrangement of the sipe.

According to the invention, there is provided in a pneumatic tire having improved wet performance, comprising a tread of a rib type pattern divided into three or more ribs by at least two circumferential grooves so that said tread defines both side regions and the remaining central region by a pair of said circumferential grooves arranged close to both side ends of said tread and is provided at each region with sipes, the improvement wherein each of said sipes arranged on both side regions is inclined at a small angle with respect to the circumferential line of the tire and each of said sipes arranged on said remaining central region is inclined at a small angle with respect to the transverse line of the tire.

As used herein and illustrated in the drawing, the term "blind sipes" means sipes that are separated and discontinuous in the circumferential direction and transverse direction of the tread and both ends of each sipe are not open at the tread end or the circumferential groove.

In a preferred embodiment of the invention, the sipes in each region are alternately inclined in opposite directions along the circumferential line and transverse line of the tire and also the inclination angle is not more than 40°, preferably not more than 35°. Further, the sipe has a depth corresponding to at least 25% of the depth of the circumferential groove adjoining to the sipe-containing rib. Moreover, the sipe arrangement density expressed as a ratio of a total projected area of sipes on a plane including the circumferential or transverse line of the tire to a product of whole surface area of ribs in each region and depth of circumferential groove defining the side region and central region is 0.0045–0.45 $cm^{-1}$, preferably 0.02–0.1 $cm^{-1}$ in the both side regions and 0.01–0.6 $cm^{-1}$, preferably 0.15–0.30 $cm^{-1}$ in the remaining central region.

BRIEF DESCRIPTION OF THE DRAWINGS

The invention will be described with reference to the accompanying drawings, wherein:

FIGS. 1a and 1b are schematically sectional view and developed view of a main part of the tread as a fundamental embodiment according to the invention; and FIG. 2 is a developed view of an embodiment of the tread pattern according to the invention.

DETAILED DESCRIPTION OF THE INVENTION

In general, it is well-known that the edge effect of so-called sipes arranged in each of three or more ribs, which are divided from the tire tread by at least two circumferential grooves, can contribute to improve wet performance of the tire. The term "sipe" used herein means a cut cleaved in the tread at such a narrow gap of about 0.5–1.5 mm that the opposed ends are substantially closed to each other at the ground contact area.

Heretofore, such sipes have usually been arranged in the ribs or blocks of the tread defined by two or several circumferential grooves or further transverse grooves crossing therewith. In this case, these sipes have been arranged at substantially the same inclination angle in the ribs or blocks over the whole of the tread. That is, it has not been considered what role be played by each of different sipes arranged in the different position in the tread on which the rib or block is located.

On the contrary, the inventors have made studies with respect to the sipe arrangement and found that when the sipes are arranged at a small inclination angle with respect to the transverse line of the tire, the braking and traction properties among the wet performances are effective but the cornering property is poor due to the tendency of decreasing the rib rigidity, while when the sipes are arranged at a small inclination angle with respect to the circumferential line of the tire, the cornering property is effective but the braking and traction properties are poor. Based on this knowledge, the invention aims at the simultaneous establishment of the wet performances by newly considering the arrangement of sipes varied in accordance with the position of the rib in the tread.

The term "transverse line of the tire" used herein means an intersection line of a plane including the rotational axis of the tire with the outer surface of the tread, and the term "circumferential line of the tire" means an intersection line of a plane perpendicular to the aforementioned plane with the outer surface of the tread.

In FIG. 1 is shown the fundamental idea of the invention, wherein FIGS. 1a and 1b are sectional view and developed view of a tread having a rib type pattern defined with two grooves and three ribs.

In this figure, numeral 1 is a tread, numeral 2 a rib, numerals 3, 4 sipes, and numeral 5 a circumferential groove.

Although the circumferential groove 5 is illustrated in the from of zigzag groove, it may be a straight groove extending in parallel with the circumferential line of the tire or an odd-shaped zigzag groove extending wavily or provided with a parallel part or a notch. The width of the circumferential groove is about 3 to 8% of the tread width as measured between the opposed groove walls in a direction perpendicular to the groove wall. Moreover, the rib 2 may be cut by shallow or narrow transverse grooves or similar members (not shown).

In the illustrated embodiment, the tread 1 is divided into three ribs 2 by the two circumferential grooves 5. In general, the number of the ribs corresponds to a value obtained by adding 1 to the number of the circumferential grooves. According to the invention, the tread 1 defines both side regions Ssh and remaining central region Sc by a pair of circumferential grooves 5 arranged close to both side ends of the tread 1.

In both side regions Ssh, each of the sipes 3 is arranged at an inclination angle $\alpha$ of not more than 40°, preferably not more than 35° with respect to the circumferential line e of the tire, while each of the blind sipes 4 in the remaining central region Sc is arranged at an inclination angle $\beta$ of not more than 40°, preferably not more than 35° with respect to the transverse line m of the tire. Further, it is desirable that the sipes in each region are alternately inclined in opposite directions along the circumferential line e of the tire.

Each of the blind sipes 3 and 4 is cleaved at such a gap of 0.5–1.5 mm that the opposed ends are closed to each other at the ground contact area of the tire, and has a length corresponding to at least 5 times of the gap. The depths $h_{3i}$ and $h_{4i}$ of the blind sipes 3 and 4 should be at least 25% of the depth H of the circumferential groove 5, respectively.

Moreover, the sipes 3 in each of both side regions Ssh satisfy $0.0045 \text{ cm}^{-1} \leq \rho_3 \leq 0.45 \text{ cm}^{-1}$, preferably $0.02 \text{ cm}^{-1} \leq \rho_3 \leq 0.1 \text{ cm}^{-1}$, wherein $\rho_3$ is a ratio of total projected area of the sipes 3 on a plane including the circumferential line e of the tire ($\Sigma l_{3i} \times h_{3i}$) to a product of whole surface area of rib in each of both side regions Ssh and groove depth H, while the sipes 4 in the remaining central region Sc satisfy $0.01 \text{ cm}^{-1} \leq \rho_4 \leq 0.6 \text{ cm}^{-1}$, preferably $0.15 \text{ cm}^{-1} \leq \rho_4 \leq 0.30 \text{ cm}^{-1}$, wherein $\rho_4$ is a ratio of total projected area of the sipes 4 on a plane including the transverse line m of the tire ($\Sigma l_{4i} \times h_{4i}$) to a product of whole surface area of rib in the remaining central region Sc and groove depth H.

When each value of $\rho_3$ and $\rho_4$ exceeds the upper limit, the wear resistance is degraded due to the reduction of rib rigidity and rather the wet performances are deteriorated, while when it is less than the lower limit, the effect of enhancing the wet performances can not particularly be obtained.

The ground contact pressure distribution of tread during usual straight-running is larger in the central region of the tread 1 than in the side region thereof, while the ground contact pressure of the side region of the tread 1 subjected to side force in the cornering considerably increases. That is, the side force opposed to centrifugal force acting on the vehicle in the cornering is born by the side region of the tread receiving such a force, while the braking or traction force acting on the tire during the straight-running is mainly born by the central region of the tread. In this connection, the individual inclination arrangement of the blind sipes 3 and 4 shown in FIG. 1b is to lead the sure ground contacting of the tire by cutting water film with edges of the sipes 3 and 4 under the action of the above forces.

In the arrangement of linear sipes shown in FIG. 1b, the inclination angle is defined by an intersecting angle to the circumferential line e or transverse line m. The shape of the blind sipes 3 and 4 formed in the tread is dependent upon the tread design and may frequently be polygonal or wavy. In the latter case, the standard on the inclination angle of sipe is not necessarily clear. Therefore, assuming a minimum rectangle $R_3$ or $R_4$ defined by the circumferential line and transverse line surrounding the sipe, if the general inclination arrangement of the sipe is defined as an angle between the diagonal line of the rectangle and the circumferential line e or transverse line m, it is confirmed to serve the object aimed at the invention.

The invention is advantageously applicable to the enhancement of wet performance in heavy duty pneumatic radial tires for use in truck, bus and the like among automotive vehicles.

The invention will be described in detail with reference to the following examples.

Four kinds of tires having a tire size of 11R 22.5 14PR were prepared by applying a zigzag rib type pattern defined by four circumferential grooves shown in FIG. 2 as follows.

Comparative Example A: no sipe

Comparative Example B: The sipes in both side regions Ssh and remaining central region Sc were arranged at alternate inclination angles of $+30°$ and $-30°$ with respect to the transverse line m of the tire.

$\rho_3$: 0.02 cm$^{-1}$,
$\rho_4$: 0.20 cm$^{-1}$

Comparative Example C: The sipes in both side regions Ssh and remaining central region Sc were arranged at alternate inclination angles of $+20°$ and $-20°$ with respect to the circumferential line e of the tire.

$\rho_3$: 0.04 cm$^{-1}$,
$\rho_4$: 0.08 cm$^{-1}$

Adaptable Example: The sipes in both side regions Ssh were arranged at alternate inclination angles $\alpha$ of $+20°$ and $-20°$ with respect to the circumferential line e, while the sipes in the remaining central region Sc were arranged at alternate inclination angles $\beta$ of $+30°$ and $-30°$ with respect to the transverse line m.

$\rho_3$: 0.04 cm$^{-1}$,
$\rho_4$: 0.20 cm$^{-1}$

In these examples other than Comparative Example A, the gap of all sipes was 0.75 mm, while the depths $h_{3i}$ and $h_{4i}$ of the sipes 3 and 4 were 50% and 85% of the groove depth H, respectively.

Therefore, the tires of Comparative Examples B and C are quite different from the tire of Adaptable Example according to the invention in the point of taking no individual inclination arrangement of sipes in both side regions Ssh or remaining central region Sc.

Each of these tires to be tested was subjected to actual running tests in accordance with the following evaluations to obtain results shown in the following table by an index on the basis that the value of Comparative Example A be 100.

1. Braking property at wet state: reciprocal number of braking distance at 60 km/hr (cm$^{-1}$).

2. Cornering property at wet state: critical rotation speed (km/hr) when the speed is increased in the rotation at constant radius.

3. Wear resistance: running distance per unit worn quantity (km/mm) after the actual running over a distance of 50,000 km.

|  | Comparative Example | | | Adaptable Example |
| --- | --- | --- | --- | --- |
|  | A | B | C |  |
| Braking property at wet state | 100 | 110 | 100 | 108 |
| Cornering property at wet state | 100 | 102 | 110 | 108 |
| Wear resistance | 100 | 98 | 98 | 98 |

As apparent from the above table, the tire of Comparative Example B is good in the braking property at wet state as compared with Comparative Example A but the cornering property at wet state is hardly enhanced, while the tire of Comparative Example C is good in the cornering property at wet state but has no effect of enhancing the braking property at wet state. On the contrary, in the tire according to the invention, both the braking and cornering properties at wet state are considerably enhanced without substantially degrading wear resistance.

According to the invention, both the braking or traction property and the cornering property on wet road are enhanced by arranging the sipes formed in the tread at such an inclination angle that the sipes in both side regions of the tread divided by a pair of circumferential groove close to side ends of the tread and the sipes in the remaining central rib region are suitable to play a role in themselves.

What is claimed is:

1. A pneumatic tire with improved wet performance comprising a new tire as molded having; a tread of a rib type pattern divided into at least three ribs by at least two circumferential grooves so that said tread defines both side regions and the remaining central region by a pair of said circumferential grooves arranged close to both side ends of said tread, said tread being provided at each region with blind sipes, and each of said sipes arranged on said both side regions and being alternately inclined in opposite directions at a small angle with respect to the circumferential line of the tire and each of said sipes arranged on said remaining central region and being alternately inclined in opposite directions at a small angle with respect to the transverse line of the tire.

2. The pneumatic tire according to claim 1, wherein said sipes have an inclination angle of not more than 40°.

3. The pneumatic tire according to claim 1 wherein said sipes have a depth corresponding to at least 25% of a depth of said circumferential groove adjoining to the rib on which said sipe is arranged.

4. The pneumatic tire according to claim 1, wherein said sipes are arranged at a sipe arrangement density, which is expressed as a ratio of a total projected area of sipes on a plane including the transverse or circumferential line of the tire to a product of whole surface area of ribs in each region and depth of circumferential groove defining said side region and central region, of 0.0045–0.45 $cm^{-1}$ in both side regions and 0.01–0.6 $cm^{-1}$ in the remaining central region, respectively.

* * * * *